United States Patent
Collins et al.

(10) Patent No.: US 9,137,729 B2
(45) Date of Patent: Sep. 15, 2015

(54) METHOD AND DEVICES FOR ROUTING IN A SATELLITE-BASED COMMUNICATION SYSTEM

(75) Inventors: Brian Collins, Feldmeilen (CH); Claude Dziedzic, Mulhouse (FR)

(73) Assignee: Abbey Technology Gmbh, Zug (CH)

( * ) Notice: Subject to any disclaimer, the term of this patent is extended or adjusted under 35 U.S.C. 154(b) by 349 days.

(21) Appl. No.: 13/642,094

(22) PCT Filed: Apr. 20, 2010

(86) PCT No.: PCT/CH2010/000107
§ 371 (c)(1),
(2), (4) Date: Feb. 1, 2013

(87) PCT Pub. No.: WO2011/130862
PCT Pub. Date: Oct. 27, 2011

(65) Prior Publication Data
US 2013/0143552 A1 Jun. 6, 2013

(51) Int. Cl.
*H04W 40/00* (2009.01)
*H04B 7/185* (2006.01)

(52) U.S. Cl.
CPC ............. *H04W 40/00* (2013.01); *H04B 7/1856* (2013.01); *H04B 7/18508* (2013.01)

(58) Field of Classification Search
CPC .............................. H04B 7/1856; H04W 40/00
USPC ........... 455/427, 431, 433, 435.1, 414.1, 445, 455/12.1, 13.2, 428, 7, 3.02, 3.04
See application file for complete search history.

(56) References Cited

U.S. PATENT DOCUMENTS

| 5,559,865 A * | 9/1996 | Gilhousen ...................... 455/431 |
| 6,321,084 B1 * | 11/2001 | Horrer ........................... 455/431 |
| 2005/0255845 A1 * | 11/2005 | Leuca et al. ................... 455/427 |

FOREIGN PATENT DOCUMENTS

| CN | 1374766 A | 10/2002 |
| WO | WO 98/26521 | 6/1998 |
| WO | WO 01/15337 A1 | 3/2001 |
| WO | WO 01/99309 A1 | 12/2001 |

OTHER PUBLICATIONS

CN Examination Report; English Translation; dated Jan. 6, 2015; 15 pages.

* cited by examiner

*Primary Examiner* — John J Lee
(74) *Attorney, Agent, or Firm* — Knobbe Martens Olson & Bear LLP (57) ABSTRACT

A satellite-based communication system (1) comprises a router system (6) which receives from a switching unit (3) via a satellite system (4) network addressing information associated with communication terminals (2) connected to the switching unit (3). The network addressing information of the communication terminals (2) are stored in the router system (6) assigned to telephone numbers associated with the communication terminals (2). For enabling an exchange unit (7) to route via the satellite link (40) received data to the communication terminal (2), the router system (6) transmits to the exchange unit (7) the network addressing information associated with the communication terminals (2) connected to the switching unit (3). Hence, data can be routed flexibly in the satellite-based communication system (1) between communication terminals (2, 2') which are not configured for satellite communication and which are used by mobile users who may move in areas covered by different satellites (43).

15 Claims, 4 Drawing Sheets

METHOD AND DEVICES FOR ROUTING IN A SATELLITE-BASED COMMUNICATION SYSTEM

This application is the U.S. National Phase under 35 U.S.C. §371 of International Application No. PCT/CH2010/000107, filed Apr. 20, 2010, titled METHOD AND DEVICES FOR ROUTING IN A SATELLITE-BASED COMMUNICATION SYSTEM.

FIELD OF THE INVENTION

The present invention relates to a method and devices for routing in a satellite-based communication system. Specifically, the present invention relates to a method of routing in a satellite-based communication system; and a computer-based router system, a computer-based switching unit, and a computer-based exchange unit for the satellite-based communication system.

BACKGROUND OF THE INVENTION

Satellite-based communication systems are particularly useful in areas without availability of an operational terrestrial infrastructure for wired and/or wireless communication. Use of satellite-based communication is particularly common in off-shore areas, e.g. on maritime vessels or oil drilling platforms; in remote and/or undeveloped land areas, e.g. desert or mountain regions; or for temporary deployment, e.g. in military or emergency scenarios.

U.S. 2004/0121729 describes a mobile communications infrastructure for mobile emergency telecommunications and video-streaming. The mobile communications infrastructure is installed and/or transported on a communications van, vehicle, or trailer or the like, and comprises a networking module which includes a plurality of inputs and outputs and a POTS (Plain Old Telephone Service) line connection. The mobile communications infrastructure further comprises a satellite module coupled to the networking module for up-linking and down-linking a satellite data stream with a communications satellite, and a wireless telecommunications module bi-directionally coupled to the networking module for receiving telecom data from and transmitting telecom data to the networking module. The wireless telecommunications module includes a wireless cellular base station which functions as a "private" cellular provider exclusively for users of the mobile communications infrastructure; thus, users can place calls to other users on the private cellular system. Through the POTS lines connected to the mobile communications infrastructure, users then have the ability to dial out from the private cellular system into the Public Switched Telephone Network (PSTN).

However, although a satellite communications link is established between the mobile communications infrastructure and a satellite teleport facility, the mobile communications infrastructure of U.S. 2004/0121729 does not appear to be fully suitable for maritime deployment, because it is not clear how (off-shore) users of the private cellular system could place calls to outside (on-shore) users or how outside users could contact users of the private cellular system, respectively, if there are no POTS lines connected to the mobile communications infrastructure.

WO 2008/014520 describes a mobile communication terminal for performing VoIP (Voice over Internet Protocol) communication via a satellite relay. The mobile communication terminal includes a wireless communication interface which is configured to communicate with an IP-based network through satellites that communicate with land-based gateways.

Although the mobile communication terminal according to WO 2008/014520 enables an individual user to communicate via a satellite communication link with remote communication partners, by many users it is considered inefficient in terms of hardware and communication costs in scenarios with a plurality of possibly concurrent users.

U.S. 2009/0004997 describes a portable emergency call center comprising a satellite receiver. According to U.S. 2009/0004997, a user of a wired or wireless phone dials an emergency number "911". The landline, wireless or VoIP call is forwarded via an IP network with an indication of the destination of the generic portable Public Service Answering Point (PSAP). A router of the "911" emergency service provider provides routing information related to the designated generic portable PSAP and the message is sent over a satellite link to the generic portable PSAP where the emergency call is put through to an operator.

While U.S. 2009/0004997 teaches how to reach via satellite link a designated portable emergency call center, it does not appear to make it possible for users to contact via satellite remote communication partners who are selected freely and arbitrarily by the user.

SUMMARY OF THE INVENTION

It is an object of this invention to provide a method and devices for routing in a satellite-based communication system, which method and devices do not have at least some of the disadvantages of the prior art. In particular, it is an object of the present invention to provide a method and devices for routing data in a satellite-based communication system between users of the communication system who are selected freely and/or ad hoc as communication partners. In particular, it is another object of the present invention to provide a method and devices for routing data flexibly in a satellite-based communication system between communication terminals which are not necessarily configured for satellite communication. In particular, it is a further object of the present invention to provide a method and devices for routing satellite-based communication for mobile users who may move in areas that are covered by different satellites.

According to the present invention, these objects are achieved particularly through the features of the independent claims. In addition, further advantageous embodiments follow from the dependent claims and the description.

According to the present invention, the above-mentioned objects are particularly achieved in that for routing in a satellite-based communication system, received in a router system, via a satellite link from a switching unit, is network addressing information associated with at least one communication terminal connected to the switching unit, whereby the addressing information is configured to address the communication terminal at the switching unit. The network addressing information of the communication terminal is stored in the router system assigned to a telephone number associated with the communication terminal. Routing requests are received in the router system. In response to a routing request received from an exchange unit and related to the telephone number associated with a communication terminal connected to the switching unit, the network addressing information associated with the communication terminal is transmitted from the router system to the exchange unit, for enabling the exchange unit to route via the satellite link received data to the communication terminal.

Typically, the switching units are located off-shore, e.g. on a mobile maritime vessel or on a fixed oil rig, while the exchange units are installed fixed on land. Thus, data can be routed flexibly in the satellite-based communication system between off-shore and on-shore communication terminals which are not necessarily configured for satellite communication and which are used by mobile users who may move in areas covered by different satellites.

In a preferred embodiment, stored in the router system are dialling prefixes assigned in each case to a network address of an exchange unit which is connected to a Public Switched Telephone Network. In response to a routing request received from the switching unit and related to a telephone number having a dialling prefix, the network address of an exchange unit is transmitted from the router system to the switching unit via the satellite link. In response to a routing request received from a first switching unit and related to a telephone number which does not have a dialling prefix, network addressing information associated with a communication terminal connected to a second switching unit is transmitted from the router system to the first switching unit via the satellite link.

Thus, data can be routed flexibly between communication terminals at an off-shore switching unit and remote communication terminals at other off-shore switching units or on-shore exchange units.

In an embodiment, received in the router system, via the satellite link from the switching unit, is a system-unique user identification to be associated with the communication terminal. The router system determines a system unique telephone number which is assigned to the user identification. The system unique telephone number is stored in the router system assigned to the network addressing information associated with the communication terminal.

Thus, a user is provided with his own system unique telephone number which remains associated with the user independent from the user's communication terminal or location.

In another embodiment, voice signals, received from one of the communication terminals connected to the switching unit, are converted in the switching unit to voice data packets; while voice data packets, received via the satellite link, are converted in the switching unit to voice signals. Furthermore, voice data packets, received from the switching unit, are converted in the exchange unit to voice signals; while voice signals, received via the Public Switched Telephone Network, are converted in the exchange unit to voice data packets.

Thus, the satellite-based communication system provides for voice data communication, e.g. VoIP communication, between mobile users of off-shore and on-shore communication terminals which are not necessarily configured for satellite communication.

In another preferred embodiment, call requests for a called telephone number are received in the switching unit from the communication terminals connected to the switching unit. A routing request for the called telephone number is transmitted from the switching unit via the satellite link to the router system. In response to a routing request related to a called telephone number having a dialling prefix, the network address of an exchange unit is received in the switching unit via the satellite link from the router system. In response to a routing request related to a called telephone number which does not have a dialling prefix, network addressing information associated with a communication terminal connected to another switching unit is received in the switching unit, via the satellite link from the router system. Received call data, which includes network addressing information associated with one of the communication terminals connected to the switching unit, is routed by the switching unit to that one of the communication terminals.

In a further preferred embodiment, call requests for a called telephone number are received in the exchange unit from the communication terminals connected to the exchange unit. A routing request for the called telephone number is transmitted from the exchange unit to the router system. In response to a routing request related to a called telephone number having a dialling prefix, the network address of another exchange unit is received in the exchange unit from the router system. In response to a routing request related to a called telephone number which does not have a dialling prefix, network addressing information associated with a communication terminal connected to a switching unit is received in the exchange unit from the router system. Received call data, which includes the network addressing information associated with one of the communication terminals connected to the switching unit, is routed by the exchange unit via a satellite link to that one of the communication terminals.

In addition to the method of routing data in a satellite-based communication system, the present invention also relates to a computer-based router system, a computer-based switching unit, and a computer-based exchange unit for the satellite-based communication system.

As outlined below, in the satellite-based communication system, the switching unit is configured to interact with the router system, the exchange unit is configured to interact with the router system, and the router system is configured to interact with the switching unit and the exchange unit. Preferably, the satellite-based communication system comprises a plurality of mobile switching units and a plurality of exchange units connected to the router system. Preferably, the data communication between the switching units, the router system and the exchange units is performed by way of transmitting and receiving IP data packets, e.g. TCP (Transmission Control Protocol) and/or UDP (User Datagram Protocol) packets.

The router system comprises a registration module configured to receive, via a satellite link from a switching unit, network addressing information associated with at least one communication terminal connected to the switching unit, and to store the network addressing information of the communication terminal assigned to a telephone number associated with the communication terminal. The router system further comprises a routing module configured to receive routing requests, and to transmit to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal.

In a preferred embodiment, the router system further comprises a configuration module configured to store dialling prefixes assigned in each case to a network address of an exchange unit which is connected to a Public Switched Telephone Network. Furthermore, the routing module of the router system is configured to transmit to the switching unit via the satellite link the network address of an exchange unit, in response to a routing request received from the switching unit and related to a telephone number having a dialling prefix, and to transmit to a first switching unit via the satellite link network addressing information associated with a communication terminal connected to a second switching unit, in response to a routing request received from the first switching unit and related to a telephone number which does not have a dialling prefix.

In a further embodiment, the registration module of the router system is configured to receive, via the satellite link from the switching unit, a system-unique user identification to be associated with the communication terminal, to determine a system unique telephone number which is assigned to the user identification, and to store the system unique telephone number assigned to the network addressing information associated with the communication terminal.

In an embodiment, at least one of the exchange units is part of the router system, the at least one of the exchange units comprises a converter module configured to convert voice data packets received from the switching unit to voice signals, and to convert voice signals received via the Public Switched Telephone Network to voice data packets.

The switching unit comprises a first communication interface for data communication with one or more communication terminals connected to the switching unit, and a second communication interface for data communication via a satellite link with a router system which is connected via exchange units to one or more Public Switched Telephone Networks. The switching unit further comprises a registration module configured to transmit to the router system via the satellite link network addressing information associated in each case with the communication terminals, the addressing information being configured to address the communication terminals at the switching unit. Furthermore, the switching unit comprises a routing module configured to receive, from the communication terminals connected to the switching unit, call requests for a called telephone number, to transmit to the router system via the satellite link a routing request for the called telephone number, and to route via the first communication interface to one of the communication terminals connected to the switching unit received call data which includes network addressing information associated with that one of the communication terminals.

In an embodiment, the routing module of the switching unit is further configured to receive, from the router system via the satellite link, the network address of an exchange unit, in response to a routing request related to a called telephone number having a dialling prefix, and to receive, from the router system via the satellite link, network addressing information associated with a communication terminal connected to another switching unit, in response to a routing request related to a called telephone number which does not have a dialling prefix.

In a further embodiment, the registration module of the switching unit is further configured to receive from one of the communication terminals connected to the switching unit a system-unique user identification, to transmit the user identification and the network addressing information associated with that one of the communication terminal to the router system via the satellite link for having the router system determine a system unique telephone number which is assigned to the user and store the system unique telephone number assigned to the network addressing information associated with that one of the communication terminal.

The exchange unit comprises a first communication interface for communication with one or more communication terminals connected to the exchange unit via a Public Switched Telephone Network, and a second communication interface for data communication with a router system of the satellite-based communication system and with a ground satellite terminal of the satellite-based communication system for establishing a satellite link with communication terminals connected to remote switching units. The exchange unit further comprises a routing module configured to receive from the communication terminals connected to the exchange unit call requests for a called telephone number, and to transmit to the router system a routing request for the called telephone number. The routing module of the exchange unit is further configured to receive from the router system network addressing information associated with a communication terminal connected to a switching unit, in response to the routing request related to the called telephone number, and to route via a satellite link to one of the communication terminals connected to the switching unit received call data which includes the network addressing information associated with that one of the communication terminals.

In an embodiment, the exchange unit further comprises a registration module configured to transmit to the router system a network address and a dialling prefix associated with the exchange unit for storing the network address in the router system assigned to the dialling prefix. The routing module of the exchange unit is further configured to receive from the router system the network address of another exchange unit, in response to a routing request related to a called telephone number having a dialling prefix, and to receive from the router system network addressing information associated with a communication terminal connected to a switching unit, in response to a routing request related to a called telephone number which does not have a dialling prefix.

In addition to the method and devices for routing data in a satellite-based communication system, the present invention also relates to computer program products comprising computer program code, preferably computer program products comprising each a tangible computer-readable medium having stored thereon the computer program code.

A first computer program product comprises a tangible computer-readable medium having stored thereon computer program code which directs one or more processors of a router system for a satellite-based communication system, such that the router system receives, via a satellite link from a switching unit, network addressing information associated with at least one communication terminal connected to the switching unit, the addressing information being configured to address the communication terminal at the switching unit; stores the network addressing information of the communication terminal assigned to a telephone number associated with the communication terminal; receives routing requests; and transmits to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal.

Preferably, the first computer program product comprises further computer program code which directs the processors of the router system to store dialling prefixes assigned in each case to a network address of an exchange unit which is connected to a Public Switched Telephone Network; to transmit to the switching unit via the satellite link the network address of an exchange unit, in response to a routing request received from the switching unit and related to a telephone number having a dialling prefix; and to transmit to a first switching unit via the satellite link network addressing information associated with a communication terminal which is connected to a second switching unit, in response to a routing request received from the first switching unit and related to a telephone number which does not have a dialling prefix.

A second computer program product comprises a tangible computer-readable medium having stored thereon computer program code which directs one or more processors of a switching unit for a satellite-based communication system, such that the switching unit transmits to a router system of the satellite-based communication system via a satellite link network addressing information associated with one or more communication terminals connected to the switching unit, the addressing information being configured to address the communication terminals at the switching unit, for storing the network addressing information in the router system; receives from the communication terminals connected to the switching unit call requests for a called telephone number; transmits to the router system via the satellite link a routing request for the called telephone number; and routes to one of the communication terminals connected to the switching unit received call data which includes network addressing information associated with that one of the communication terminals.

Preferably, the second computer program product comprises further computer program code which directs the processors of the switching unit to receive, via the satellite link from the router system, the network address of an exchange unit, in response to a routing request related to a called telephone number having a dialling prefix; and to receive, via the satellite link from the router system, network addressing information associated with a communication terminal connected to another switching unit, in response to a routing request related to a called telephone number which does not have a dialling prefix.

A third computer program product comprises a tangible computer-readable medium having stored thereon computer program code which directs one or more processors of an exchange unit for a satellite-based communication system and connected to a Public Switched Telephone Network, such that the exchange unit receives from communication terminals connected to the exchange unit call requests for a called telephone number; transmits to the router system a routing request for the called telephone number; receives from the router system network addressing information associated with a communication terminal connected to a switching unit, in response to the routing request related to the called telephone number; and routes, via a satellite link to one of the communication terminals connected to the switching unit, received call data which includes the network addressing information associated with that one of the communication terminals.

Preferably, the third computer program product comprises further computer program code which directs the processors of the exchange unit to transmit to a router system of the satellite-based communication system a network address and a dialling prefix associated with the exchange unit, for storing the network address in the router system assigned to the dialling prefix; to receive from the router system the network address of another exchange unit, in response to a routing request related to a called telephone number having a dialling prefix; and to receive from the router system network addressing information associated with a communication terminal connected to a switching unit, in response to a routing request related to a called telephone number which does not have a dialling prefix.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
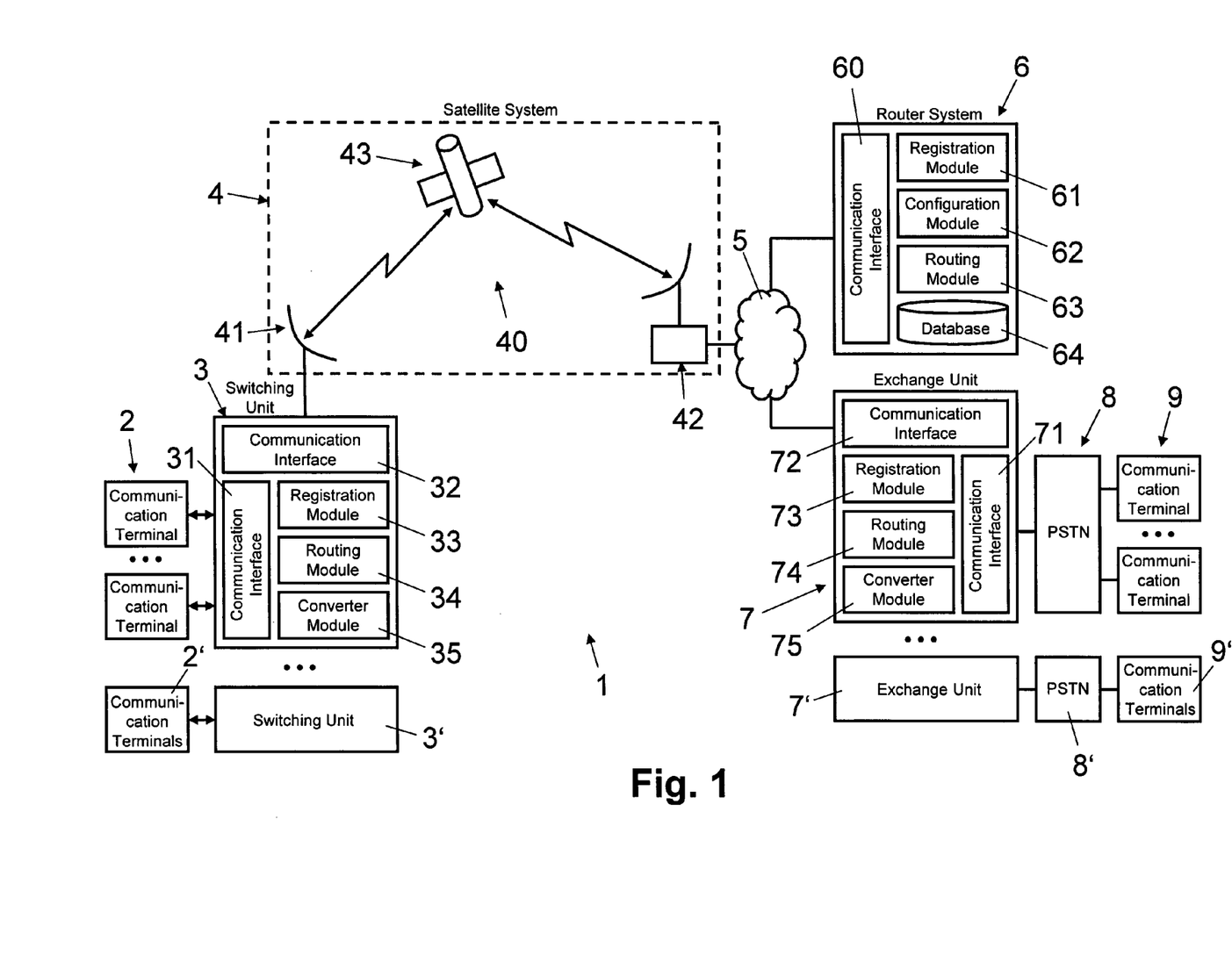
FIG. 1 shows a block diagram illustrating schematically a satellite-based communication system comprising switching units connected via a satellite link to a router system and exchange units connected via a telecommunications network to the router system.

In FIG. 1, reference numeral 1 refers to a satellite-based communication system comprising one or more switching units 3, 3', a router system 6, and one or more exchange units 7, 7'. The switching units 3, 3' are in each case connected to a satellite system 4, specifically to a ground satellite terminal 41 of the satellite system 4. Likewise the router system 6 and the exchange units 7, 7' are in each case connected via a telecommunications network 5 to the satellite system 4, specifically to one or more ground satellite terminals 42 of the satellite system 4. The telecommunications network 5 is an IP network and comprises leased communication lines and/or private or public communication networks. One or more satellite relay stations 43 of the satellite system 4, preferably in geostationary orbits, make it possible to establish a satellite (communication) link 40 between the ground satellite terminals 41, 42. Thus, connections can be established between the switching units 3 and the router system 6 as well as between the switching units 3 and the exchange units 7 in each case via a satellite communication link 40 in the satellite system 4. In an embodiment, the router system 6 and/or one or more exchange units 7, 7' are connected directly to the satellite system 4, e.g. to ground satellite terminal 42.

Preferably, the satellite system 4 is configured for IP communication (supporting TCP and UDP) and provides IP routing which makes the satellite system 4 or its satellite communication links 40, respectively, transparent to IP networks, e.g. telecommunications network 5, connected to the satellite system 4. This transparency makes it possible for IP data packets to be routed via a satellite communication link 40 without the sending or receiving entities having to be informed about the current geographic location of the ground satellite terminals 41, 42 which are used to establish the satellite communication link 40 as the physical communication layer.

A switching unit 3 includes an operational computer with one or more processors. The switching units 3 include a communication interface 31 for communicating with communication terminals 2 via wired or wireless connections. Moreover, the switching units 3 include a communication interface 32 for communicating with the satellite system 4, specifically with the local ground satellite terminal 41, and via the satellite system 4, specifically via the local ground satellite terminal 41, the satellite link 40, and the ground satellite terminal 42, with the router system 6 and the exchange units 7, preferably via IP. The switching units 3 include further functional modules, namely a registration module 33, a routing module 34, and a converter module 35, which will be explained later in more detail. Typically, the switching units 7 are arranged in different remote locations as fixed or mobile units, e.g. off-shore on a maritime vessel or an oil drilling platform. Accordingly, the communication terminals 2 are considered remote, e.g. off-shore, units.

An exchange unit 7 includes one or more operational computers with one or more processors. As illustrated schematically in FIG. 1, the exchange units 7 are connected in each case to one or more Public Switched Telephone Networks (PSTN) 8 operated in each case by a specific network operator. The exchange units 7 include a communication interface 71 for communicating with communication terminals 9 via the PSTN 8. Moreover, the exchange units 7 include a communication interface 72 for communicating via the telecommunications network 5 with the router system 6 and the satellite system 4, and via the satellite system 4, specifically via the ground satellite terminal 42, the satellite link 40 and the ground satellite terminal 41, with the switching units 3, preferably via IP. The exchange units 7 include further functional modules, namely a registration module 73, a routing module 74, and a converter module 75, which will be explained later in more detail. Typically, the exchange units 7 are arranged in different countries or states providing world wide connectivity to the PSTN 8. Accordingly, the communication terminals 9 are considered on-shore units.

The router system 6 includes one or more operational computers with one or more processors. As illustrated schematically in FIG. 1, the router system 6 includes a communication interface 60 for communicating via the telecommunications network 5 with the exchange units 7, 7' and the satellite system 4, and via the satellite system 4, specifically via the ground satellite terminal 42, the satellite link 40 and the ground satellite terminal 41, with the switching units 3, 3' preferably via IP, including TCP and/or UDP. The router system 6 includes further functional modules, namely a registration module 61, a configuration module 62, and a routing module 63, which will be explained later in more detail. Typically, the router system 6 is arranged as a hub or central unit in one common and fixed location.

Preferably, the functional modules are implemented as programmed software modules comprising computer program code for directing a processor of a computer to perform functions as described later in more detail. The computer program code is stored on a tangible computer-readable medium which is connected fixed or removably in the respective computer. One skilled in the art will understand, however, that in alternative embodiments the functional modules may be implemented fully or at least partly by way of hardware components.

The communication terminals 2, 2', 9, 9' include but are not limited to fixed or mobile telephones, fixed or mobile personal computers, and personal data assistants for data and/or voice communication, particularly for Voice over IP (VoIP) communication. For example, the communication terminals 2, 2', 9, 9' include conventional wired handsets or mobile radio phones such as GSM (Global System for Mobile Communication), UMTS (Universal Mobile Telecommunication System) or DECT (Digital Enhanced Cordless Telecommunications), or mobile computers with a WLAN (Wireless Local Area Network), Bluetooth, or other communication modules for mobile communication. In an embodiment, the communication terminals 2, 2' further include a device identifier, stored in the communication terminal 2, 2', and/or an IMSI (International Mobile Subscriber Identity), e.g. stored on a chip card which is connected to the communication terminal 2, 2'.

In the following paragraphs, described with reference to FIGS. 2-5 are possible sequences of steps performed by the functional modules for routing in the satellite-based communication system 1, particularly, for routing data, including voice data, specifically VoIP data, or other data, e.g. e-mail data, SMS (Short Messaging Services) data, Instant Messaging data, voice mail data, chat service data, Internet browsing data or any other user data.

Figure 2:
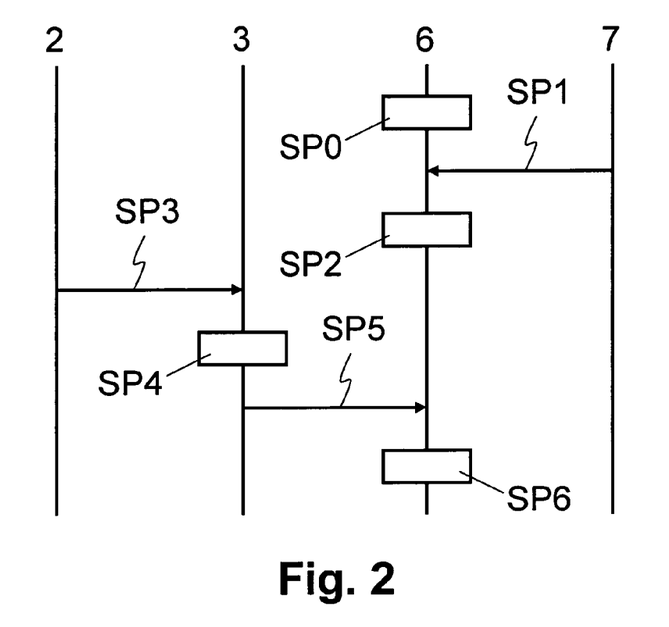
FIG. 2 shows a flow diagram illustrating an exemplary sequence of preparatory steps for registering users, communication terminals, switching units and exchange units at the router system.

FIG. 2 shows a flow diagram illustrating an exemplary sequence of preparatory steps SP0-SP6 for registering users, communication terminals 2, switching units 3 and exchange units 7 at the router system 6.

In step SP0, subscribed users of the satellite-based communication system 1 are registered in the router system 6. Specifically, a system-specific, personal and unique telephone number and a system-specific, unique personal identification number (PIN) are received by the registration module 61 and stored for the user in a database 64 of the router system 6.

In an embodiment, the telephone number and PIN are generated by the registration module 61. For example the PIN includes eight or more characters, e.g. alphanumeric characters with or without special characters. The user's registration data may further include name, address, current (system-specific) credit value, preferred payment method and further information associated with the user.

In steps SP1 and SP2, the exchange units 7 of the satellite-based communication system 1 are registered with the router system 6. For example, in step SP1, for registering the exchange unit 7 the respective registration module 73 transmits a registration request to the router system 6. In step SP2, the exchange registration data is received by the configuration module 62 and stored in the database 64 of the router system 6. In an embodiment, the exchange registration data is received by the configuration module 62 via a user interface of the router system 6. The exchange registration data includes the network address of the exchange unit 7, e.g. an IP address, and dialling prefixes associated with the PSTN 8 connected to the respective exchange unit 7. In an embodiment, the dialling prefixes are further associated with a specific network operator of a PSTN 8. Moreover, time-specific (carrier) rate tables are assigned to the dialling prefixes and/or network operators of a PSTN 8.

In step SP3, one or more communication terminals 2 are connected to the switching unit 3 via communication interface 31. Depending on the type of the communication terminal 2 and/or the particular embodiment, the connection is established through a wire connection or wireless. In an embodiment, connecting a communication terminal 2 to the switching unit 3 includes entry of the user's PIN. Alternatively, a specific communication terminal 2 may be shared by various users who enter their own PIN ad hoc when they are actually using the communication terminal 2.

In step SP4, the communication terminals 2 are registered by the registration module 33 storing in the switching unit 3 for each of the connected communication terminals 2 network addressing information suitable for addressing the communication terminal 2 at the switching unit 3, preferably an IP address and a port number, and the user's PIN. As indicated above, a specific communication terminal 2 is either assigned in a fixed fashion to a user and his PIN (locked-in), or dynamically, as needed, to one of several users and his individual PIN (ad-hoc). The registration information associated with a communication terminal 2 may further include a device identifier and/or an IMSI associated with the communication terminal 2 or its user, respectively.

In step SP5, registered with the router system 6 are the switching unit 3, the communication terminals 2 connected to the switching unit 3, and the current users of the communication terminals 2. Specifically, the registration module 33 transmits registration data via the satellite link 40 to the router system 6. The registration data is transmitted via communication interface 32, ground satellite terminal 41, satellite relay station 43, ground satellite station 42, and telecommunications network 5, preferably via IP, e.g. via TCP/IP. The registration data includes the network addressing information of the connected communication terminals 2 and the PIN's of the users currently assigned to the communication terminals, if available. Depending on the embodiment, the registration data further includes device identifiers and/or IMSI's associated with the communication terminals 2 or its users, respectively. The registration data is transmitted to the router system 6 as part of a connection request for establishing the satellite link 40, as part of a registration request at start-up of the switching unit 3, and/or as part of a dynamic registration update request when a new (ad hoc) user enters his PIN to use one of the connected communication terminals 2. Moreover, transmitted with the registration data are the network addressing information of the switching unit 3 and, in an embodiment, an identification of the ground satellite terminal 41 connected to the switching unit 3, e.g. the IMSI associated with the ground satellite terminal 41.

In step SP6, the registration data is received by the registration module 61 and stored in the database 64 of the router system 6. Specifically, based on a user's PIN included in the registration data, the registration module 61 stores the network addressing information of the communication terminal 2 currently used by the user assigned to that user. For billing purposes, the registration module 61 may further store the device identifier and/or IMSI associated with the communication terminal 2 and/or the identification of the ground satellite terminal 41 assigned to the network addressing information of the communication terminal 2. Moreover, the registration module 61 stores an identifier of the switching unit 3 connected to the ground satellite terminal 41. In an embodiment, the registration module 61 confirms the registration to the switching unit 3 and includes in this confirmation the respective user's system-specific, personal and unique telephone number which is stored in the switching unit as part of the registration information associated with the communication terminal 2.

Figure 3:
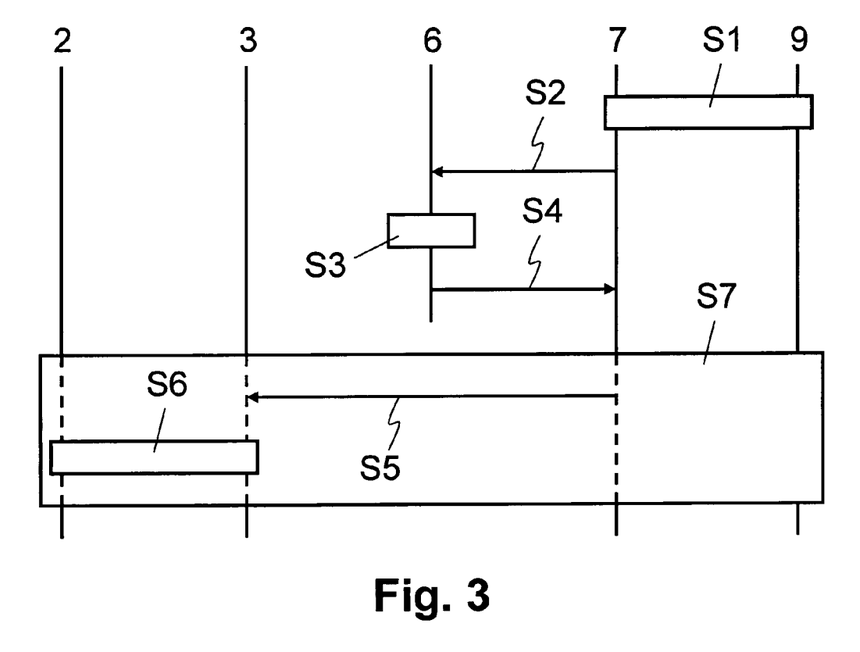
FIG. 3 shows a flow diagram illustrating an exemplary sequence of steps for setting up a communication session between a communication terminal connected to a Public Switched Telephone Network, e.g. an on-shore terminal, and a communication terminal connected via a switching unit to a satellite-based communication system, e.g. an off-shore terminal.
Figure 4:
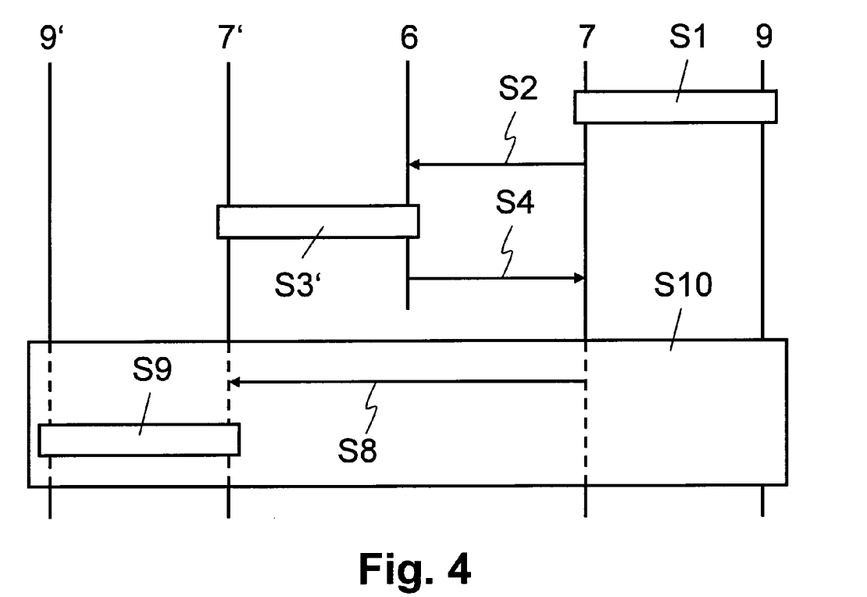
FIG. 4 shows a flow diagram illustrating an exemplary sequence of steps for setting up a communication session between communication terminals connected to different Public Switched Telephone Networks.

FIGS. 3 and 4 show flow diagrams illustrating exemplary sequences of steps for establishing an IP communication session, initiated by a communication terminal 9 connected to the PSTN 8, between the communication terminal 9 and another communication terminal 2, 9' connected to the switching unit 3 or another PSTN 8', respectively.

In step S1, a connection is established between the (on-shore) communication terminal 9 and the exchange unit 7 via the PSTN 8. First, the user uses the communication terminal 9 to connect to the exchange unit 7 by calling a (telephone) service number assigned to the exchange unit 7. The exchange unit 7 answers the inbound call and generates a voice prompt requesting the calling user to enter his personal, system specific PIN and possibly a user name. The caller's PIN is verified by the exchange unit 7 through a directory look-up at the router system 6, e.g. via TCP/IP. After having verified the identity of the caller, the routing module 74 provides to the caller a dial tone on his communication terminal 9 and receives the (telephone) number of a requested callee entered by the caller on his communication terminal 9.

In step S2, the routing module 74 of the exchange unit 7 transmits via the telecommunications network 5 to the router system 6 a routing request which includes the number of the requested callee (called number) received from the caller. Essentially, this routing request may be considered a system directory look-up request.

In step S3 or S3', respectively, the routing module 63 of the router system 6 receives the routing request from the exchange unit 7 and determines from the database 64 at the router system 6 the current network addressing information assigned to the received telephone number of the requested callee.

For telephone numbers that begin with a dialling prefix associated with a PSTN 8, 8', e.g. "00" followed by a country, state or carrier (operator) specific dialling code, e.g. "49", the routing module 63 determines in the database 64 the network address of the exchange unit 7' connected to the requested PSTN 8' defined by the dialling prefix, e.g. "0049".

In an embodiment, the routing module 63 selects from several available exchange units 7' a preferred exchange unit 7' based on time-specific carrier rate tables, following a least-cost-prioritization scheme.

In a further embodiment, as illustrated in FIG. 4, the routing module 63 reserves in step S3' at the exchange unit 7' a line to the requested PSTN 8'. For example, the routing module 63 sends a line reservation request, e.g. via TCP, to respective exchange unit 7'. If a line is available, the routing module 74 of the exchange unit 7' reserves the line, assigns a port to the reserved line, e.g. a UDP port, and returns the respective network address, e.g. an IP address and port number, to the routing module 63. Otherwise, if no line is available, the routing module 74 returns to the routing module 63 of the router system 6 a response indicating that no lines are available at the time. Depending on the situation an alternative exchange unit 7, 7' may be approached instead.

For system-specific telephone numbers that do not begin with a dialling prefix of a PSTN 8, 8', e.g. telephone numbers that do not begin with "00", the routing module 63 determines in the database 64 the network addressing information of the communication terminal 2 currently assigned (on a locked-in or ad-hoc basis) to the received telephone number of the requested callee. Thus, telephone numbers that do not begin with a dialling prefix of a PSTN 8, 8' are system-specific telephone numbers associated with subscribers of the satellite communication system 1.

In step S4, the routing module 63 of the router system 6 transmits via the telecommunications network 5 to the requesting exchange unit 7 a routing response with the determined network addressing information.

In an embodiment, the routing module 74 of the exchange unit 7 does not transmit to the router system 6 routing requests for telephone numbers having a dialling prefix associated with a PSTN 8, 8', but uses local routing and rate tables for determining the network address of the remote exchange unit 7'.

In another embodiment, the on-shore communication terminal 9 is connected through the exchange unit 7 to the router system 6 for authentication of the user and/or look-up of the dialled telephone number.

As is illustrated schematically in FIG. 3, in step S7, a communication session is established between the called communication terminal 2 and the calling communication terminal 9, for example a VoIP session or a data communication session. The communication session between the communication terminals 2, 9 is established via the switching unit 3, the satellite link 40, the telecommunications network 5, the exchange unit 7 and the PSTN 8.

In the case of a VoIP session, the converter module 75 of the exchange unit 7 converts voice data packets, received from the switching unit 3, to voice signals; and converts voice signals, received from the communication terminal 9 via PSTN 8, to voice data packets. Correspondingly, the converter module 35 of the switching unit 3 converts voice signals, received from the communication terminal 2 connected to the switching unit 3, to voice data packets; and converts voice data packets, received via the satellite link 40, to voice signals.

For example, the communication session is initiated in step S5, by the routing module 74 of the exchange unit 7 transmitting a session initiation request, e.g. a TCP message or a UDP message, to the switching unit 3 connected to the communication terminal 2, using the network addressing information of the communication terminal 2. The session initiation request is routed over IP, as an IP data packet, via the telecommunications network 5 and the satellite system 4.

Subsequently, in step S6, the switching unit 3 indicates the session initiation request via the respective port, defined by the network addressing information, to the communication terminal 2. In case of a VoIP session, the communication terminal 2 may indicate the session initiation request to the user via a user interface, e.g. by way of a ringtone, vibration and/or visual indicator.

The communication session between the communication terminals 2, 9 is established via the switching unit 3, the satellite link 40, the telecommunications network 5, the exchange unit 7 and the PSTN 8. Data from the communication terminal 9 to the callee is routed by the routing module 74 of the exchange unit 7, through the telecommunications network 5 and the satellite system 4, to the communication terminal 2 defined by network addressing information received from the router system 6.

In the established communication session between the communication terminals 2, 9 data received in the exchange unit 7 from the communication terminal 9 is routed by the routing module 74 via the telecommunications network 5, the satellite system 4, and the switching unit 3 to the communication terminal 2 defined by network addressing information received from the router system 6. In reverse direction, data received in the switching unit 3 from the communication terminal 2 is routed by the routing module 34 via the satellite system 4, the telecommunications network 5, and the exchange unit 7 to the port assigned to the PSTN line connected to the communication terminal 9.

As is illustrated schematically in FIG. 4, in step S10, a communication session is established between the called communication terminal 9' and the calling communication terminal 9, for example a VoIP session or a data communication session. The communication session between the communication terminals 9, 9' is established via the telecommunications network 5, the exchange unit 7' and the PSTN 8'.

In the case of a VoIP session, the converter modules 75 in the exchange units 7, 7' convert voice data packets, received from the remote exchange unit 7, 7', to voice signals; and convert voice signals, received from the communication terminals 9, 9', to voice data packets.

For example, the communication session is initiated in step S8, by the routing module 74 of the exchange unit 7 transmitting a session initiation request, e.g. a TCP message or a UDP message, to the remote exchange unit 7', using the network addressing information of the port assigned to the PSTN line connected to the communication terminal 9'. The session initiation request is routed over IP, as an IP data packet, via the telecommunications network 5.

Subsequently, in step S9, the exchange unit 7' indicates the session initiation request via the respective port, defined by the network addressing information, to the communication terminal 9. In case of a VoIP session, the communication terminal 9' may indicate the session initiation request to the user via a user interface, e.g. by way of a ringtone, vibration and/or visual indicator.

The communication session between the communication terminals 9, 9' is established via the exchange units 7, 7', the telecommunications network 5, and PSTN's 8, 8'. Data from the communication terminal 9 to the callee is routed by the routing module 74 of the exchange unit 7 to the port at the remote the exchange unit 7' which is assigned to the PSTN line connected to the communication terminal 9'. In reverse direction, data received from the communication terminal 9' is routed by the routing module 74 of the exchange unit 7' via the telecommunications network 5, and the exchange unit 7 to the port assigned to the PSTN line connected to the communication terminal 9.

Figure 5:
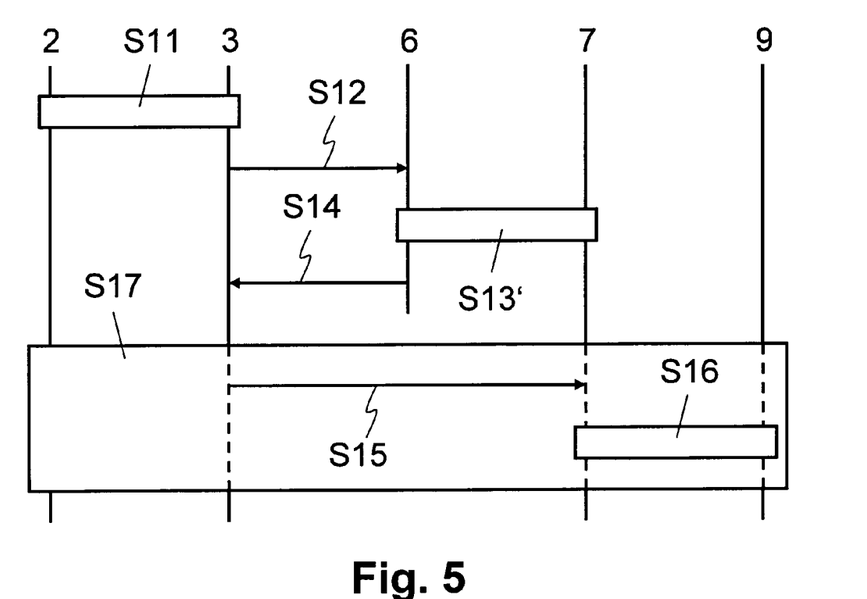
FIG. 5 shows a flow diagram illustrating an exemplary sequence of steps for setting up a communication session between a communication terminal connected via a switching unit to a satellite-based communication system, e.g. an off-shore terminal, and a communication terminal connected to a Public Switched Telephone Network, e.g. an on-shore terminal.
Figure 6:
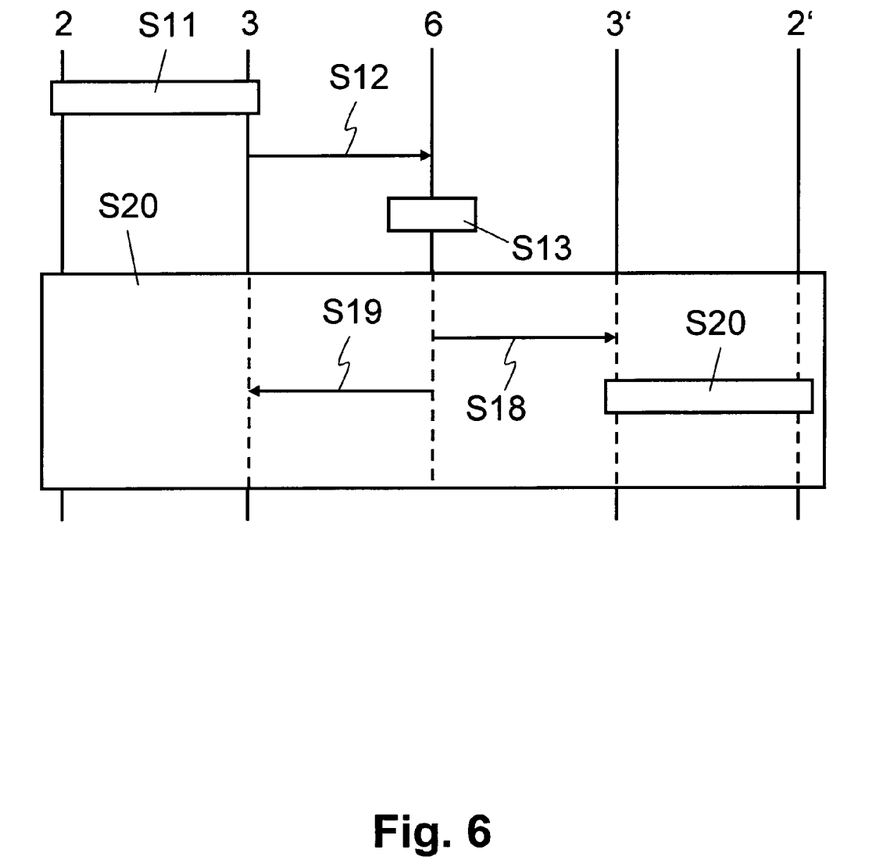
FIG. 6 shows a flow diagram illustrating an exemplary sequence of steps for setting up a communication session between two communication terminals which are both connected via a switching unit to a satellite-based communication system, e.g. off-shore terminals.

FIGS. 5 and 6 show flow diagrams illustrating exemplary sequences of steps for establishing an IP communication session, initiated by a communication terminal 2 connected to the switching unit 3, between the communication terminal 2 and another communication terminal 9, 2' connected to a PSTN 8 or another switching unit 3', respectively.

In step S11, a calling user who is either assigned in a fixed fashion (locked-in) or temporarily (ad-hoc) to a communication terminal 2 connected to the switching unit 3, uses the communication terminal 2 to establish a communication session with a remote communication terminal 9, 2' connected to a PSTN 8 or a remote switching unit 3'. The routing module 34 of the switching unit 3 provides to the user a dial tone on his communication terminal 2 and receives the (telephone) number of a requested callee entered by the caller on his communication terminal 2. The routing module 34 checks if the callee's telephone number (called number) is stored in the switching unit 3 as part of the registration information of a local communication terminal 2 connected to the switching unit 3, in which case the call is routed locally by the routing module 34.

In step S12, if the called telephone number is associated with a remote communication terminal 2', 9, the routing module 34 of the switching unit 3 transmits via the satellite link 40 to the router system 6 a routing request which includes the called telephone number received from the caller.

In steps S13 or S13', respectively, the routing module 63 of the router system 6 receives the routing request from the switching unit 3 and determines from the database 64 at the router system 6 the current network addressing information assigned to the received telephone number of the requested callee.

As described above, for telephone numbers that begin with a dialling prefix associated with a PSTN 8, 8', in step S13', the routing module 63 determines in the database 64 the network address of the exchange unit 7 connected to the requested PSTN 8 defined by the dialling prefix, possibly considering time-specific carrier rate tables. Furthermore, as outlined above in the context of FIG. 4, in step S13', the routing module 63 reserves at the selected exchange unit 7 a line to the requested PSTN 8 and receives from the exchange unit 7 the network address of the port associated with that line.

In step S14, the routing module 63 transmits to the requesting switching unit 3 via the telecommunications network 5 and the satellite link 40 a routing response with the determined network addressing information.

As is illustrated schematically in FIG. 5, in step S17, a communication session is established between the calling communication terminal 2 and the called communication terminal 9, for example a VoIP session or a data communication session. The communication session between the communication terminals 2, 9 is established via the switching unit 3, the satellite link 40, the telecommunications network 5, and the selected exchange unit 7 and connected PSTN 8.

For example, the communication session is initiated in step S15, by the routing module 34 of the switching unit 3 transmitting a session initiation request, e.g. a TCP message or a UDP message, to the selected exchange unit 7, using the network addressing information of the port assigned to the PSTN line connected to the called communication terminal 9. The session initiation request is routed over IP, as an IP data packet, via the satellite system 4 and the telecommunications network 5.

Subsequently, in step S16, the selected exchange unit 7 indicates the session initiation request via the respective port, defined by the network addressing information, to the communication terminal 9.

The communication session between the communication terminals 2 and 9, is established via the switching unit 3, the satellite link 40, the telecommunications network 5, the exchange unit 7, and the PSTN 8. Data from the communication terminal 2 to the callee is routed by the routing module 34 of the switching unit 3 through the satellite system 4 and the telecommunications network 5 to the port at the selected exchange unit 7, which is assigned to the PSTN line connected to the communication terminal 9.

As illustrated in FIG. 6, for system-specific telephone numbers that do not begin with a dialling prefix of a PSTN 8, 8', in step S13, the routing module 63 determines in the database 64 the network addressing information of the remote communication terminal 2' currently assigned (on a locked-in or ad-hoc basis) to the received telephone number of the requested callee.

Subsequently, in step S20, a communication session is established between the calling communication terminal 2 and the called communication terminal 2', for example a VoIP session or a data communication session.

Because the routing request was received from a communication terminal 2 connected to a remote switching station 3 and relates to another communication terminal 2' connected to another remote switching unit 3', i.e. the routing request relates to an off-shore-to-off-shore call, the communication session is established preferably through the router system 6.

For example, the communication session is initiated in step S18, by the routing module 63 of the router system 6 transmitting a session initiation request, e.g. a TCP message or a UDP message, to the switching unit 3', using the network addressing information of the remote communication terminal 2'. The session initiation request is routed over IP, as an IP data packet, via the telecommunications network 5 and the satellite system 4.

Subsequently, in step S20, the switching unit 3' indicates the session initiation request via the respective port, defined by the network addressing information, to the communication terminal 2'.

In step S19, the routing module 63 transmits to the requesting switching unit 3 via the telecommunications network 5 and the satellite link 40 a routing response with the determined network addressing information associated with the communication session between the remote communication terminal 2' and the router system 6.

The communication session between the communication terminals 2 and 2', is established via the switching unit 3, the satellite system 4, the telecommunications network 5, the router system 6, the telecommunications network 5, the satellite system 4, and the switching unit 3'. In the established communication session between the communication terminals 2, 2', data from the communication terminal 2 to the callee is routed by the routing module 34 of the switching unit 3 through the satellite system 4 and the router system 6 to the port at the remote communication terminal 2' which is associated with the communication session to the router system 6, e.g. an ephermal TCP back socket used to circumvent firewalls. In reverse direction, data from the callee's communication terminal 2' is routed by the routing module 34 of the remote switching unit 3' through the satellite system 4, the router system 6 and the switching unit 3 to the communication terminal 2.

At this stage it should be mentioned, that in a preferred embodiment of the satellite-based communication system 1, the Domain Name System (DNS) is used to locate and reach any components of the system, particularly, the exchange units 7, 7', the switching units 3, 3', and the router system 6.

While for billing purposes the IMSI associated with the communication terminals 2, 2' is used to identify specific users or user groups, some system-specific communication terminals 2, 2' may only include a stored device identifier which is used at the router system 6 to determine the IMSI currently assigned to the device identifier, i.e. the respective communication terminal 2, 2'.

In a preferred embodiment, the switching units 3, 3' remain connected to the router system 6 for signalling purposes, for example via UDP through the satellite system 4. In a further embodiment, for signalling purposes, the exchange units 7, 7' are also connected to the router system 6 via UDP.

The satellite-based communication system 1 also comprises a voice mail system. Essentially, upon receiving a dial tone, registered users of the satellite-based communication system 1 may enter a defined key, e.g. "*", to record a voice message followed by the phone number assigned the intended recipient.

Voice mail messages may be recorded by registered internal users, who are locked-in or assigned ad-hoc to a communication terminal 2, and/or registered external users, who dial into the system through a service number associated with an exchange unit 7, 7' and/or the router system 6. For example, the voice mail messages are stored in the database 64 at the router system 6 assigned to the recipient.

Internal or external registered users who have one or more recorded voice mail messages will be informed about these messages as soon as they use the system, i.e. when they pick up an internal system phone or dial into the system using the service number.

Upon entry of a defined key, e.g. the "#" key, the recorded voice mail message will be played to the recipient, e.g. by the router system 6.

The satellite-based communication system 1 is further configured to update automatically its components, particularly, to upgrade to the newest release version the software modules of the switching units 3, 3' and the exchange units 7, 7'. For that purpose, protocol messages transmitted by the switching units 3, 3' and the exchange units 7, 7', e.g. registration messages, routing request messages and/or session initiation messages, have included in their protocol headers a version identifier, e.g. a version number, defining the version currently installed and operating at the respective switching unit 3, 3' or exchange unit 7, 7', respectively. If a difference between version identifiers is identified, the unit 3, 3', 7, 7' having the software modules with the older or lower version is upgraded. For example, if a communication session is being established, an outdated version identifier in the header of a session initiation message is detected and recognized by an upgrade agent at the more up-to-date unit, 3, 3', 7, 7', for example. Subsequently, an upgrade agent of the unit 3, 3', 7, 7' with the outdated software is informed by the upgrade agent of the more up-to-date unit 3, 3', 7, 7' that its software version or release is outdated. In response to such an out-of-date message, the update agent of the outdated unit 3, 3', 7, 7' transmits an update request to the router system 6. An update server of the router system 6 returns an update message including software updates in the form of upgrade delta data or entire upgraded software modules to bring the outdated unit 3, 3', 7, 7' up to the newest version or release. The update agent of the outdated unit 3, 3', 7, 7' receives the update data and performs automatically an upgrade of its software modules. Thus, the satellite-based communication system 1 is configured as an automatic and self-updating system which is of particular advantage for switching units 3, 3', for example, which remain unused for longer periods of time, e.g. a switching unit 3, 3' on a private yacht.

For billing purposes, call detail records (CDR) are captured by the router system 6 and/or the exchange units 7, 7' and, preferably, stored at the database 64 of the router system 6. For associating communication costs (time, number of data packets, etc.) with a ground satellite terminal 41 used for the communication session, the IMSI of the respective ground satellite terminal 41 is included in the CDR's. Furthermore the CDR's include identifiers of the respective (prepaid or postpaid) subscribers and communication terminals 2, 2', 9, 9'. Based on the current credit value and CDR's, a prepaid subscriber or associated communication terminal 2, 2', 9, 9', respectively, will be cut-off from any communication by the router system 6 or exchange unit 7, 7', with the possible exception of emergency calls, if the subscriber's credit value reaches zero. However, the satellite-based communication system 1 allows for topping up of credit by prepaid/ad-hoc users through a dedicated top-up function.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A computer-implemented method of routing in a satellite-based communication system, the method comprising:
    receiving in a router system, via a satellite link from a switching unit, network addressing information associated with at least one communication terminal connected to the switching unit, the addressing information being configured to address the communication terminal at the switching unit;
    storing in the router system the network addressing information of the communication terminal assigned to a telephone number associated with the communication terminal;
    receiving in the router system routing requests;
    transmitting from the router system to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal;
    storing in the router system dialing prefixes assigned in each case to a network address of an exchange unit which is connected to a Public Switched Telephone Network;
    transmitting from the router system to the switching unit via the satellite link the network address of an exchange unit, in response to a routing request received from the switching unit and related to a telephone number having a dialing prefix; and
    transmitting from the router system to a first switching unit via the satellite link network addressing information associated with a communication terminal connected to a second switching unit, in response to a routing request received from the first switching unit and related to a telephone number which does not have a dialing prefix.

2. The computer-implemented method of claim 1, further comprising:
    receiving in the router system, via the satellite link from the switching unit, a system-unique user identification to be associated with the communication terminal;
    determining, by the router system, a system unique telephone number which is assigned to the user identification; and
    storing in the router system the system unique telephone number assigned to the network addressing information associated with the communication terminal.

3. The computer-implemented method of claim 1, further comprising:
    converting in the switching unit voice signals, received from one of the communication terminals connected to the switching unit, to voice data packets; and
    converting in the switching unit voice data packets, received via the satellite link, to voice signals; converting in the exchange unit voice data packets, received from the switching unit, to voice signals; and converting in the exchange unit voice signals, received via the Public Switched Telephone Network, to voice data packets.

4. A computer-implemented method of routing in a satellite-based communication system, the method comprising:
    receiving in a router system via a satellite link from a switching unit, network addressing information associated with at least one communication terminal connected to the switching unit, the addressing information being configured to address the communication terminal at the switching unit;
    storing in the router system the network addressing information of the communication terminal assigned to a telephone number associated with the communication terminal;
    receiving in the router system routing requests;

transmitting from the router system to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal;

receiving in the switching unit, from the communication terminals connected to the switching unit, call requests for a called telephone number;

transmitting, from the switching unit via the satellite link to the router system, a routing request for the called telephone number;

receiving in the switching unit, via the satellite link from the router system, the network address of an exchange unit, in response to a routing request related to a called telephone number having a dialing prefix;

receiving in the switching unit, via the satellite link from the router system, network addressing information associated with a communication terminal connected to another switching unit, in response to a routing request related to a called telephone number which does not have a dialing prefix; and routing by the switching unit to one of the communication terminals connected to the switching unit received call data which includes network addressing information associated with that one of the communication terminals.

5. A computer-implemented method of routing in a satellite-based communication system, the method comprising:

receiving in a router system via a satellite link from a switching unit, network addressing information associated with at least one communication terminal connected to the switching unit, the addressing information being configured to address the communication terminal at the switching unit;

storing in the router system the network addressing information of the communication terminal assigned to a telephone number associated with the communication terminal;

receiving in the router system routing requests;

transmitting from the router system to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal;

receiving in the exchange unit, from the communication terminals connected to the exchange unit, call requests for a called telephone number;

transmitting from the exchange unit to the router system a routing request for the called telephone number; receiving in the exchange unit from the router system the network address of another exchange unit, in response to a routing request related to a called telephone number having a dialing prefix;

receiving in the exchange unit from the router system network addressing information associated with a communication terminal connected to a switching unit, in response to a routing request related to a called telephone number which does not have a dialing prefix; and routing by the exchange unit via a satellite link to one of the communication terminals connected to the switching unit received call data which includes the network addressing information associated with that one of the communication terminals.

6. A computer-based router system for a satellite-based communication system, the router system comprising:

a non-transitory computer-readable medium that stores a registration module configured to receive, via a satellite link from a switching unit, network addressing information associated with at least one communication terminal connected to the switching unit, the addressing information being configured to address the communication terminal at the switching unit, and to store the network addressing information of the communication terminal assigned to a telephone number associated with the communication terminal;

a routing module configured to receive routing requests, and to transmit to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal;

a configuration module configured to store dialing prefixes assigned in each case to a network address of an exchange unit which is connected to a Public Switched Telephone Network; and the routing module being further configured to transmit to the switching unit via the satellite link the network address of an exchange unit, in response to a routing request received from the switching unit and related to a telephone number having a dialing prefix, and to transmit to a first switching unit via the satellite link network addressing information associated with a communication terminal connected to a second switching unit, in response to a routing request received from the first switching unit and related to a telephone number which does not have a dialing prefix.

7. The router system of claim 6, wherein the registration module is further configured to receive, via the satellite link from the switching unit, a system-unique user identification to be associated with the communication terminal, to determine a system unique telephone number which is assigned to the user identification, and to store the system unique telephone number assigned to the network addressing information associated with the communication terminal.

8. The router system of claim 6, wherein at least one of the exchange units is part of the router system, the at least one of the exchange units comprises a converter module configured to convert voice data packets received from the switching unit to voice signals, and to convert voice signals received via the Public Switched Telephone Network to voice data packets.

9. A computer-based switching unit for a satellite-based communication system, the switching unit comprising:

a first communication interface for data communication with one or more communication terminals connected to the switching unit;

a second communication interface for data communication via a satellite link with a router system which is connected via exchange units to one or more Public Switched Telephone Networks;

a registration module configured to transmit to the router system via the satellite link network addressing information associated in each case with the communication terminals, the addressing information being configured to address the communication terminals at the switching unit; and a routing module configured to receive, from the communication terminals connected to the switching unit, call requests for a called telephone number, to transmit to the router system via the satellite link a routing request for the called telephone number, and to route via the first communication interface to one of the communication terminals connected to the switching unit received call data which includes network addressing information associated with that one of the communication terminals, to receive, from the router system via the satellite link, the network address of an exchange unit, in response to a routing request related to a called telephone number having a dialing prefix, and to receive, from the router system via the satellite link, network addressing information associated with a communication terminal connected to another switching unit, in response to a routing request related to a called telephone number which does not have a dialing prefix.

10. A computer-based switching unit for a satellite-based communication system, the switching unit comprising:

a first communication interface for data communication with one or more communication terminals connected to the switching unit;

a second communication interface for data communication via a satellite link with a router system which is connected via exchange units to one or more Public Switched Telephone Networks;

a registration module configured to transmit to the router system via the satellite link network addressing information associated in each case with the communication terminals the addressing information being configured to address the communication terminals at the switching unit, to receive from one of the communication terminals connected to the switching unit a system-unique user identification, to transmit the user identification and the network addressing information associated with that one of the communication terminal to the router system via the satellite link for having the router system determine a system unique telephone number which is assigned to the user and store the system unique telephone number assigned to the network addressing information associated with that one of the communication terminal; and a routing module configured to receive, from the communication terminals connected to the switching unit, call requests for a called telephone number, to transmit to the router system via the satellite link a routing request for the called telephone number, and to route via the first communication interface to one of the communication terminals connected to the switching unit received call data which includes network addressing information associated with that one of the communication terminals.

11. A computer-based exchange unit for a satellite-based communication system, the exchange unit comprising:

a first communication interface for communication with one or more communication terminals connected to the exchange unit via a Public Switched Telephone Network;

a second communication interface for data communication with a router system of the satellite-based communication system and with a ground satellite terminal of the satellite-based communication system for establishing a satellite link with communication terminals connected to remote switching units;

a routing module configured to receive from the communication terminals connected to the exchange unit call requests for a called telephone number, to transmit to the router system a routing request for the called telephone number, to receive from the router system network addressing information associated with a communication terminal connected to a switching unit, in response to the routing request related to the called telephone number, and to route via a satellite link to one of the communication terminals connected to the switching unit received call data which includes the network addressing information associated with that one of the communication terminals;

a registration module configured to transmit to the router system a network address and a dialing prefix associated with the exchange unit for storing the network ad-dress in the router system assigned to the dialing prefix; and the routing module being further configured to receive from the router system the network address of another exchange unit, in response to a routing request related to a called telephone number having a dialing prefix, and to receive from the router system network addressing information associated with a communication terminal connected to a switching unit, in response to a routing request related to a called telephone number which does not have a dialing prefix.

12. A computer program product comprising a tangible non-transitory computer-readable medium having stored thereon computer program code which directs one or more processors of a router system for a satellite-based communication system, such that the router system receives, via a satellite link from a switching unit, network addressing information associated with at least one communication terminal connected to the switching unit, the addressing information being configured to address the communication terminal at the switching unit;

stores the network addressing information of the communication terminal assigned to a telephone number associated with the communication terminal;

receives routing requests;

transmits to an exchange unit the network addressing information associated with the communication terminal connected to the switching unit, in response to a routing request received from the exchange unit and related to the telephone number associated with the communication terminal, for enabling the exchange unit to route via the satellite link received data to the communication terminal;

stores dialing prefixes assigned in each case to a network address of an exchange unit which is connected to a Public Switched Telephone Network;

transmits to the switching unit via the satellite link the network address of an exchange unit, in response to a routing request received from the switching unit and related to a telephone number having a dialing prefix; and transmits to a first switching unit via the satellite link network addressing information associated with a communication terminal connected to a second switching unit, in response to a routing request received from the first switching unit and related to a telephone number which does not have a dialing prefix.

13. A computer program product comprising a tangible non-transitory computer-readable medium having stored thereon computer program code which directs one or more processors of a switching unit for a satellite-based communication system, such that the switching unit transmits to a router system of the satellite-based communication system via a satellite link network addressing information associated with one or more communication terminals connected to the switching unit, the addressing information being configured to address the communication terminals at the switching unit;

receives from the communication terminals connected to the switching unit call requests for a called telephone number;

transmits to the router system via the satellite link a routing request for the called telephone number;

routes to one of the communication terminals connected to the switching unit received call data which includes network addressing information associated with that one of the communication terminals;

receives, from the router system via the satellite link, the network address of an exchange unit, in response to a routing request related to a called telephone number having a dialing prefix, and     receives, from the router system via the satellite link, network addressing information associated with a communication terminal connected to another switching unit, in response to a routing request related to a called telephone number which does not have a dialing prefix.

14. A computer program product comprising a tangible non-transitory computer-readable medium having stored thereon computer program code which directs one or more processors of an exchange unit for a satellite-based communication system and connected to a Public Switched Telephone Network, such that the exchange unit     receives from communication terminals connected to the exchange unit call requests for a called telephone number;

transmits to the router system a routing request for the called telephone number;

receives from the router system network addressing information associated with a communication terminal connected to a switching unit, in response to the routing request related to the called telephone number;

routes, via a satellite link to one of the communication terminals connected to the switching unit, received call data which includes the network addressing information associated with that one of the communication terminals;

transmits to the router system a network address and a dialing prefix associated with the exchange unit for storing the network ad-dress in the router system assigned to the dialing prefix;

receives from the router system the network address of another exchange unit, in response to a routing request related to a called telephone number having a dialing prefix, and     receives from the router system network addressing information associated with a communication terminal connected to a switching unit, in response to a routing request related to a called telephone number which does not have a dialing prefix.

15. A computer program product comprising a tangible non-transitory computer-readable medium having stored thereon computer program code which directs one or more processors of a switching unit for a satellite-based communication system, such that the switching unit transmits to a router system of the satellite-based communication system via a satellite link network addressing information associated with one or more communication terminals connected to the switching unit, the addressing information being configured to address the communication terminals at the switching unit;

receives from the communication terminals connected to the switching unit call requests for a called telephone number;

transmits to the router system via the satellite link a routing request for the called telephone number;

routes to one of the communication terminals connected to the switching unit received call data which includes network addressing information associated with that one of the communication terminals;

receives from one of the communication terminals connected to the switching unit a system-unique user identification; and     transmits the user identification and the network addressing information associated with that one of the communication terminal to the router system via the satellite link for having the router system determine a system unique telephone number which is assigned to the user and store the system unique telephone number assigned to the network addressing information associated with that one of the communication terminal.

\* \* \* \* \*

UNITED STATES PATENT AND TRADEMARK OFFICE
CERTIFICATE OF CORRECTION

| | | |
|---|---|---|
| PATENT NO. | : 9,137,729 B2 | Page 1 of 1 |
| APPLICATION NO. | : 13/642094 | |
| DATED | : September 15, 2015 | |
| INVENTOR(S) | : Brian Collins et al. | |

It is certified that error appears in the above-identified patent and that said Letters Patent is hereby corrected as shown below:

In the claims

In column 18 at line 57, In Claim 4, change "system" to --system,--.

In column 19 at line 33, In Claim 5, change "system" to --system,--.

In column 21 at line 35 (approx.), In Claim 10, change "terminals" to --terminals,--.

Signed and Sealed this
Seventeenth Day of May, 2016

Michelle K. Lee
*Director of the United States Patent and Trademark Office*